United States Patent Office 3,542,525
Patented Nov. 24, 1970

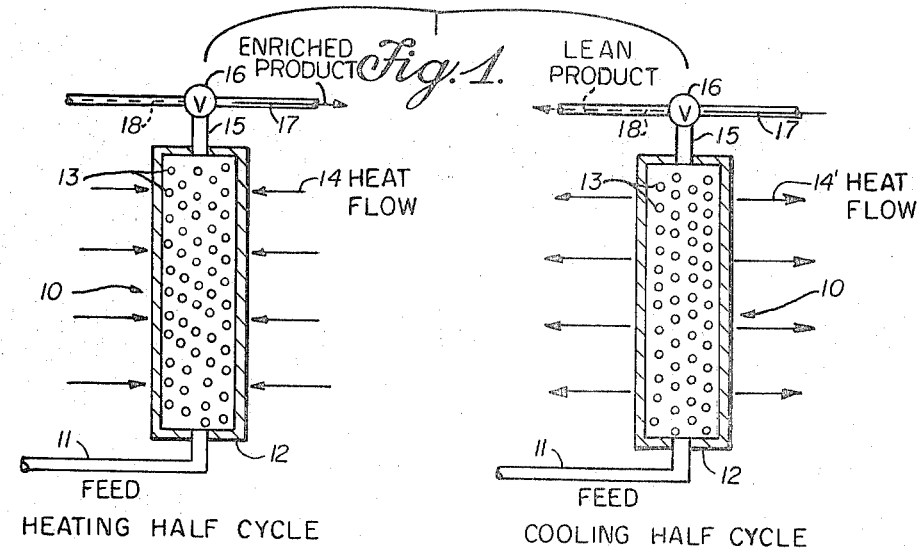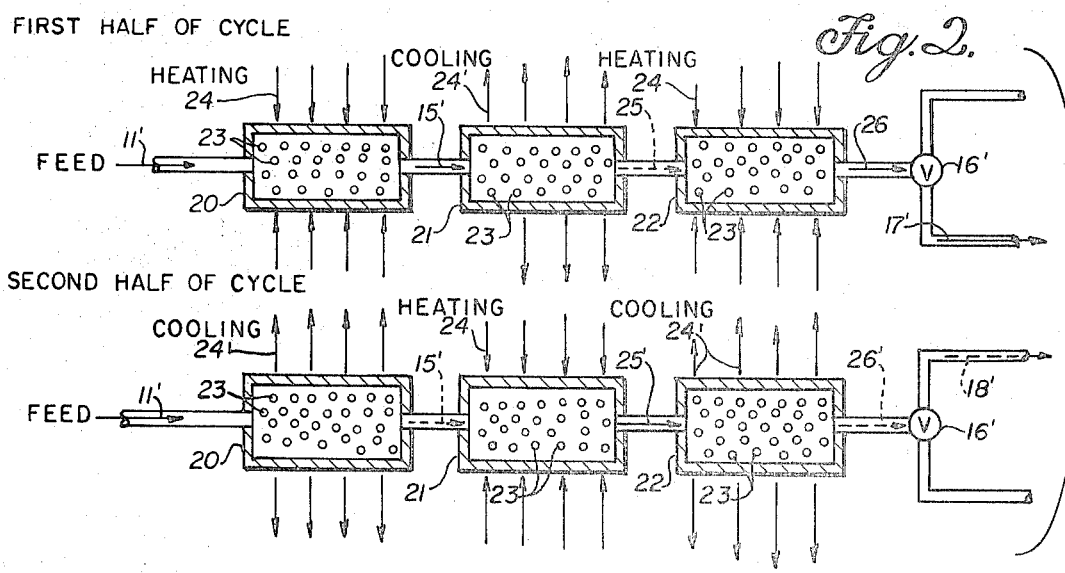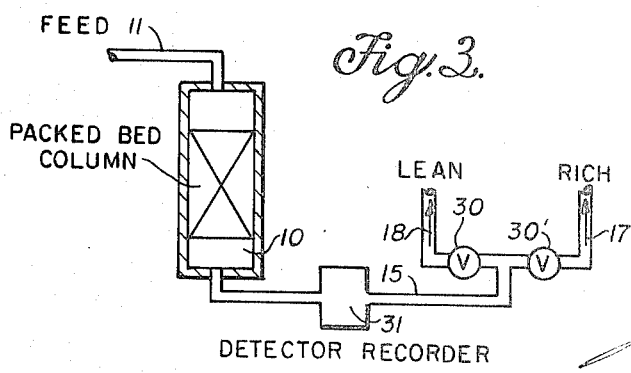

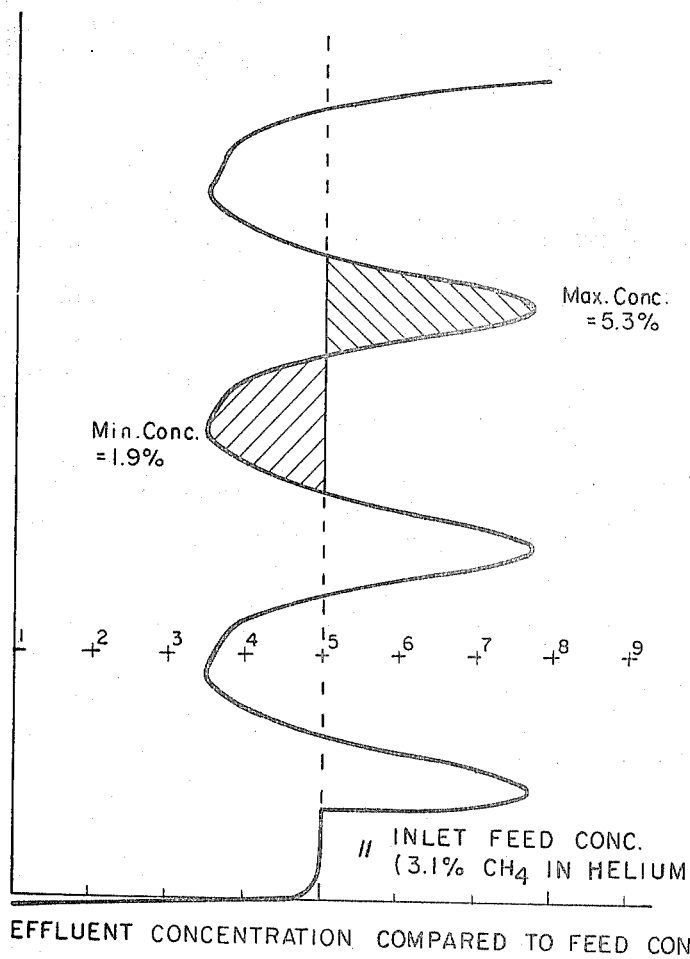

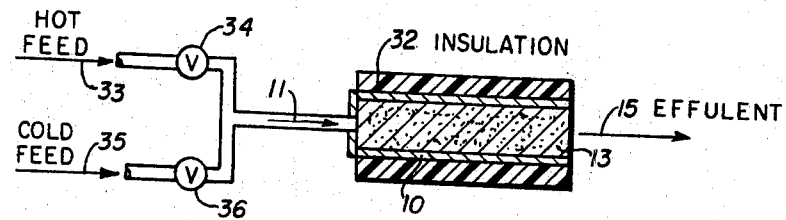
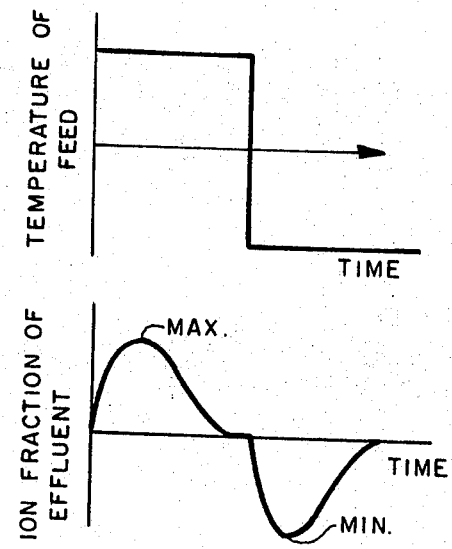
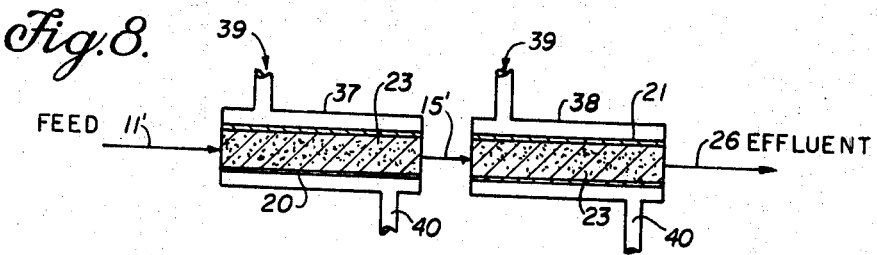
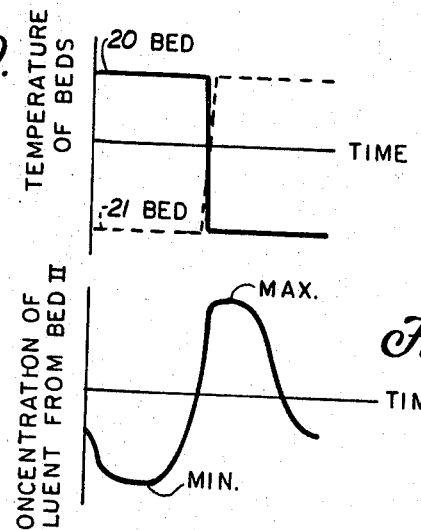

3,542,525
CYCLING ZONE ADSORPTION PROCESS
Robert L. Pigford, El Cerrito, and Burke Baker III, and Dwain E. Blum, Berkeley, Calif., assignors to the United States of America as represented by the United States Atomic Energy Commission
Filed Feb. 24, 1969, Ser. No. 801,390
Int. Cl. B01d *15/06*
U.S. Cl. 23—311          6 Claims

ABSTRACT OF THE DISCLOSURE

A method for separating one or more components from a fluid mixture wherein a fluid mixture of two or more components is allowed to flow continuously through a tube filled with a powdered solidly packed adsorbent. Introduction or removal of heat through the tube wall causes the temperature of the solid to cycle and causes the composition of the effluent stream to fluctuate about the feed composition. Separation of the effluent into portions richer and leaner than the feed accomplishes a separation. The effect can be multiplied by using several stages, the heating and cooling being out of phase in adjacent stages. Alternately, the heat can be supplied cyclicly to the feed stream of fluid, the packed sections of the adsorber tube being thermally insulated. Furthermore, interstage heat regenerators can be used to re-use heat in subsequent stages, thereby increasing thermal efficiency. Cyclic variations in pressure or in electrical charge can be substituted for the variations in heat supply. A series arrangement of stages can be employed to yield nearly complete recovery of the components.

BACKGROUND OF THE INVENTION

The invention described herein was made in the course of, or under, Contract No. W-7405-ENG-48, with the United States Atomic Energy Commission.

This invention is directed to a chemical engineering unit operations procedure for separating one or more components from a fluid mixture, and more particularly to such a procedure utilizing continuous adsorption and desorption for producing large amounts of the desired components at a steady rate.

In the past, separation of the fluid components, was accomplished by the batch approach of passing a feed stream through a cold adsorber bed to preferentially adsorb a desired fraction or component therefrom until the bed is fully charged, then cutting off the flow of feed and heating the adsorber to discharge it. While the prior efforts produced satisfactory results, the operation was relatively slow and thus the production of the separated components was small and intermittent when compared to the steady flow rate and thus large amounts of components separated by the present invention.

Also, effort in the past has produced an oscillation flow by passing the fluid through the adsorbent in one direction and then through in the opposite direction as proposed in an article by R. W. Wilhelm et al. published in Industrial and Engineering Chemistry-Fundamentals 7, pages 337–349 (1968). It is claimed in that article that oscillation flow must accompany the oscillating input of heat, which claim is believed proven to be untrue by results produced during tests on the present invention. Again, however, in any of the known prior efforts, there is no continuous adsorption and desorption permitting a continuous flow rate in one direction, as accomplished by the present invention.

SUMMARY OF THE INVENTION

The procedure of the present invention has the feed passing through the bed uninterrupted while the bed is cyclically cooled and heated such that the effluent fluid component is cyclically depleted and enriched in the desired fraction. By using a multiplicity of beds in simple, uncascaded series, and maintaining the heating-cooling cycle approximately 180° out of phase timewise from one to the next, travelling wavefronts of enhanced enrichment and depletion course through the series, such that these enriched or depleted sections of the wavefronts can be separated by appropriate switching valve mechanisms.

Therefore, it is an object of this invention to provide a method for separating one or more components from a fluid mixture.

A further object of the invention is to provide a method for extracting one or more components from a fluid mixture where a continuous adsorption and desorption procedure is utilized.

Another object of the invention is to provide a fluid mixture component separation process wherein a fluid mixture is continuously directed through a bed of adsorbent material while the bed is cyclically cooled and heated such that the effluent is cyclically depleted and enriched in the desired component such that same can be readily separated.

Another object of the invention is to provide a method for separating one or more components from a fluid mixture wherein the cycling zone adsorption thereof has the ability to act continuously and to produce large amounts of the desired component(s) at a steady rate.

Other objects and advantages of the present invention will become readily apparent from the following description and accompanying drawings:

BRIEF DESCRIPTION OF THE DRAWINGS

FIG. 1 is a schematic view illustrating inventive concept;

FIG. 2 is a schematic view illustrating a series of adsorbent beds being cyclically cooled and heated in accordance with the invention; and FIGS. 3–10 schematically show test apparatus and diagrammatically illustrate results of tests utilizing the inventive concept.

DESCRIPTION OF THE INVENTION

FIG. 1 shows one section or zone indicated generally at 10 of the continuously acting cycling adsorber. A fluid mixture 11 flows continuously through a container or tube 12 containing a bed of packed adsorbent particles 13, which are alternately heated and cooled, the heating half cycle, illustrated on the left hand side of FIG. 1, being shown by the heat flow arrows 14 directed toward tube 12; while the cooling half cycle, illustrated on the right hand side of FIG. 1, is indicated by the heat flow arrows 14' being directed away from tube 12. Thus heat transfer is accomplished by supplying or removing heat through the walls of tube 12, as indicated by heat flow arrows 14 and 14', producing a cycling change of the temperature of the packed particles 13. This causes the composition of the fluid 15 leaving the tube 12 to cycle around the feed composition of fluid mixture 11 as an average. The effluent stream 15 is divided by a switching valve 16 into half-wavelength portions which are alternately enriched and depleted, as indicated at 17 and 18, respectively. The concentrated or enriched and the lean or depleted fractions 17 and 18 can then be collected separately, thus accomplishing a separation of the fractions or components of the fluid 11.

The basis of separation produced by the present invention is the ability of the packed adsorbent particles or bed to remove adsorbate molecules from the fluid when the bed is cold and to release the same molecules into other fluid which comes through the bed later when the bed (packed particles) is hot. Thus solute is removed from some segments of the fluid stream and is added to adjacent segments of the stream.

If a number of such thermally cycling sections or zones 10 of FIG. 1 are arranged in series a greater separation can be achieved. FIG. 2 shows schematically how such zones would be connected by connecting, for example, three containers or tubes 20, 21 and 22 in series, each of the tubes containing packed adsorbent particles indicated at 23. The feed of fluid mixture 11' is directed into tube 20. In the first half of the cycle of fluid through tubes 20, 21 and 22, tubes 20 and 22 are being heated as indicated by the heat flow arrows 24 and the legend; while tube 21 is being cooled as indicated by heat flow arrows 24' and the legend. In the second half of the cycle, tubes 20 and 22 are cooling, while tube 21 is heating. It is important to the process that heating and cooling be done simultaneously in the adjacent zones and that one zone be heating while the adjacent zone or zones are cooling. It is also important that the period of switching from heating to cooling be carefully related to the time of passage of a concentration wave through one section of the series. The resulting standing wave of heat flow and temperature changes causes further enrichment of the concentration waves as they pass successively through the series of packed beds within tubes 20, 21 and 22.

The operation of the series concept of the invention as carried out by the FIG. 2 arrangement is as follows: during the first half of the cycle, and assuming that the fluid had been previously flowing through the containers or tubes 20, 21 and 22, the fluid mixture or feed 11' enters tube 20 which is being heated such that the packed adsorbent particles 23 are releasing the previously adsorbed molecules into the fluid flowing through tube 20, thus the effluent stream 15' flowing into tube 21 is enriched. The enriched fluid stream 15' enters tube 21 which is being cooled such that the packed adsorbent particles 23 therein are removing adsorbate molecules from the fluid flowing therethrough, thus the effluent stream 25 flowing into tube 22 is depleted of the desired component as compared with that of fluid stream 15'. The depleted fluid stream 25 enters tube 22 which is being heated such that the packed adsorbent particels 23 therein are releasing the previously adsorbed molecules into the fluid flowing therethrough thereby increasing the concentration of the desired component therein, thus the effluent stream 26 flowing to switching value 16' is greatly enriched compared to that of stream 15' leaving tube 20. As before described, enriched half-wavelength portions 17' of the fluid stream 26 is directed by valve 16' for being separately collected or utilized.

The second half of the FIG. 2 half cycle described is directly opposite in that the effluent stream 15' leaving the tube 20 is depleted of the desired component, the effluent stream 25' from tube 21 is greatly enriched in the desired component compared to the fluid of feed 11', while the effluent stream 26' from tube 22 is depleted in the desired component compared to that entering same such that depleted half-wavelength portions 18' of the fluid stream 26' is directed by switching valve 16' to a collector or point of use. It is thus seen that the resulting standing wave of heat flow and temperature changes causes further enrichment of the concentration waves as they pass successively through the series of packed beds. With sufficient zones or sections (tubes) in series, tests have shown that it is sometimes possible to produce a nearly complete separation, concentrating all of a solute into half the fluid.

It has been found that it is not necessary to supply heat through the walls of the tubes containing the adsorbent beds, a process which could be slow for large beds. Alternatively as described hereinafter with respect to FIG. 5, the entering fluid or feed could be alternately heated and cooled by means such as heat exchangers placed before the adsorber tubes. As the velocity of travel of a thermal wave through the packed bed usually exceeds that of a concentration wave, this mode of heating and cooling does not alter the separation. In the case of the series configuration, interstage heat regenerators can be used to produce the approximately 180° phase shift in temperature necessary for a multiple separation effect in the stage following the regenerator.

Multicomponent mixtures can be separated by adjusting residence times of fluid and cycle times of the heat flow such that one of the components is enriched most rapidly or so that one component is not enriched at all, all the others being concentrated.

After treatment of a solution in one train or series of cycling zone adsorbers it may be desirable, after rectification of the output wave of concentration, to send one or both of the streams to other stages or adsorber trains. Thus, doubling the concentration of the feed mixture to the plant is not a limitation. Indeed, complete recovery of components should be possible.

Applications of the cycling zone adsorption process include removal of salt from sea water using thermally sensitive mixed-bed ion exchange resins as the adsorbent material; separation of rare earths from their aqueous solution using ion exchange resins as the adsorbent; purification of mixtures of organic compounds which might ordinarily be distilled; separation of the components of gaseous mixtures such, for example, as ethylene or acetylene from other light hydrocarbons; and others. In fact, any separations which can be done with a gas chromatographic column can be done continuously with the inventive cycling zone adsorption technique. Thus, separations should be possible for compounds which are chemically very similar and provided a suitable adsorbent can be found.

Also, other cycling inputs can be used. For example, drying of gases can be accomplished efficiently by cycling the pressure as the gas flows through the adsorbent bed. Some adsorption equilibria may be changed by cyclic electrical effects.

The following example with reference to corresponding drawings schematically show the apparatus and diagrammatically illustrate the results of tests conducted utilizing the inventive concept.

The following brief description, with reference to the FIGS. 3 and 4, is illustrative of the apparatus and operating conditions used to effect a separation of a binary gas mixture, using a single-zone cycling adsorber discussed above with respect to FIG. 1 and like reference numerals will be used for corresponding element. The apparatus of FIG. 3 consists of a feed 11 supplying a binary gas mixture to a packed-bed of adsorbent 13 in column or tube 10 with an outlet 15 directing the effluent steam from tube 10 to switching valves 30 and 30' for directing the lean portion of the stream through line 18 and the rich portion thereof through line 17. A detector-recorder unit 31 is inserted in outlet 15 as discussed hereinafter.

The following materials and operating conditions, for purpose of example, have been utilized in the FIG. 3 apparatus to obtain the results illustrated in FIG. 4:

Bed Properties: a ½ inch dia. x 8 inch bed of activated carbon (constituting adsorbent 13) is contained within a container 10 which can be heated and cooled in a cyclic manner.

Feed Gas Mixture—
Composition: 3.1 mole percent methane in helium.
Feed rate: 157 cc./min. at 25° C. and 1 atm.
Gas mean residence time: 3.07 sec.

Column Operating Conditions—
Mean temperature of bed: 50.5° C.
Temp. cycled between: 38.6° C. and 62.3° C. with a cycling period of 2.93 min./cycle.
Column pressure: 18.9 lb./sq. in. absolute.

The effluent concentration relative to the feed concentration (constant) was recorded as a function of time, using a thermal-conductivity bridge network (detector-recorder 31), a typical output being shown in FIG. 4. Note that the rich and lean portions of the effluent 15 are easily identified in FIG. 4.

Upon collection of the rich and lean portions of the effluent of the FIG. 3 apparatus, in separate vessels, we obtain the average concentration of the recorded peaks (see FIG. 4).

$CH_4$—Rich fraction: 3.9 mole percent.
$CH_4$—Lean fraction: 2.5 mole percent.

To further illustrate the utility of the one zone cycling adsorber, reference is now made to FIGS. 5–7 wherein separation of potassium and hydrogen ions in aqueous solution using an ion exchange resin is set forth.

The apparatus of FIG. 5 is similar in construction to that of FIGS. 1 and 3 except that a layer of insulation 32 is positioned around tube or column 10 containing the packed bed of solid adsorbent particles 13, and that the feed 11 is alternately or cyclically supplied with a hot feed solution or mixture 33 via a valve 34 or with a cold feed solution or mixture 35 supplied via a valve 36. The hot and cold feeds 33 and 35 are connected to a heat exchange arrangement, or other heating and cooling means, not shown, and as described above the introduction of either the hot feed or the cold feed into tube or column 10 causes the respective release and adsorption of the desired adsorbate molecules of the feed by the adsorbent material 13 in column 10, the effluent 15 being connected to a switching valve arrangement as previously described.

The following materials and operating conditions have been utilized in the FIG. 5 apparatus to obtain the results illustrated in FIGS. 6 and 7:

Liquid phase feed: aqueous solution of 0.0537 N HCl (hydrochloric acid) and 0.0585 N KCl (potassium chloride).

Solid phase or adsorbent: 50–100 mesh. (U.S. Std. Screen) Bio-Rad ZP-1 (zirconium phosphate crystals-cation exchangers).

Column: 28 cm. x 2.54 cm. I.D. glass insulated with Styrofoam.

Operation: flow rate was 11.9 cc./min. The influent (feed) temperature was cycled between 24° C. and 42° C. in a square wave, as shown in FIG. 6. The hot and cold cycles each were of 1000 second duration.

Results: for the feed $K^+$ (potassium ion) fraction $([K^+]/([K^+]+[H^-]))$ of 0.521, the maximum and minimum ion fractions (see FIG. 7) in the effluent were: maximum=0.648, and minimum=0.372.

To illustrate the utility of the plural zone or series adsorbent bed arrangement described above with respect to FIG. 2, reference is now made to FIGS. 8–10 wherein separation of acetic acid from water using activated carbon is set forth.

The apparatus of FIG. 8 is similar to that of FIG. 2 except that only two adsorbent columns or tubes 20 and 21 are utilized and heat exchange jackets or housings 37 and 38 are positioned respectively about columns 20 and 21, each of the jackets or housings 37 and 38 having coolant inlets 39 and outlets 40 for supplying heating or cooling fluids about the adsorbent beds 23 contained in columns 20 and 21. While not shown, appropriate valving, conduits, etc. are utilized to cyclically and alternately supply heating and cooling fluids to the jackets or housings 37 and 38. The effluent 26 is connected with appropriate switching valve means, not shown, for purposes previously described.

The following materials and operating conditions have been utilized in the FIG. 8 apparatus to obtain the results illustrated in FIGS. 9 and 10:

Liquid phase: aqueous solution of 0.0647 N $CH_3COOH$ (acetic acid).

Solid phase: 50–140 mesh (U.S. Std. Screen) Pittsburgh activated carbon (CAL type).

Columns: two 26 cm. x 1 cm. I.D. glass jacketed so that hot and cold water could be pumped through the jacket to heat and cool the columns.

Operation: Flow rate was 8.79 cc./min. Temperature was cycled between 4° C. and 60° C. in a square wave (see FIG. 9). The hot and cold cycles were each 1000 seconds long.

Results: For the 0.0647 N feed, maximum and minimum effluent concentrations, illustrated in FIGURE 10, were:

(1) Temperature of two columns cycled in phase:
  maximum=0.1545 N.
  minimum=0.0194 N.
(2) Temperature of two columns cycled 180° out of phase:
  maximum=0.1850 N.
  minimum=0.0056 N.

It has thus been shown that the present invention provides an effective method of separating one or more components from a fluid mixture, wherein the fluid mixture is allowed to continuously flow through a tube filed with an adsorbent material and by alternately cooling and heating the material or the fluid. The fluid mixture is separated into richer and leaner portions due to the alternate adsorption and release of the desired components, thereby producing large amounts of the components at a steady rate.

Although particular embodiments of the inventive concept have been illustrated and/or described for purpose of explanation, modifications will become apparent to those skilled in the art, and it is intended to cover in the appended claims all such modifications as come within the true spirit and scope of the invention.

What is claimed is:

1. A method for separating one or more components from a fluid mixture comprising the steps of: directing a continuous stream of the fluid mixture over at least one bed of adsorbent material capable of removing the desired adsorbate molecules of the desired component from one portion of the fluid mixture stream when the adsorbent material is cold and releasing the same molecules of the desired component into another portion of the stream; cooling the adsorbent material for removing desired component adsorbate molecules from the continuous stream of fluid mixture flowing thereby, thus depleting the desired molecules in that portion of the fluid mixture; heating the adsorbent material for releasing into the continuous stream of fluid mixture flowing thereby, the desired component molecules previously adsorbed by the adsorbent material, thus enriching the desired molecules in that portion of the fluid mixture; directing the effluent stream of fluid mixture from the bed of adsorbent material into a switching valve means, and actuating the switching valve means so as to direct the depleted molecule portion of effluent stream in one direction and the enriched molecule portion of the effluent stream in another direction thereby causing as separation of the enriched and depleted portions of the effluent fluid mixture stream for collection or other use.

2. The method defined in claim 1, additionally including the steps of: providing a plurality of adsorbent material beds; directing the continuous stream of fluid mixture serially through the plurality of adsorbent material beds; cyclically cooling and heating the adsorbent material beds in such a manner that while one of the adsorbent material beds is being cooled an adjacent bed is being heated wherein the resulting standing wave of heat flow and temperature changes causes further enrichment of the previously enriched portions of the fluid mixture stream as these portions pass successively through the heated series of adsorbent beds, thereby producing a nearly complete separation of the desired component molecules from the remainder of the fluid mixture.

3. The method defined in claim 2, wherein the steps of cooling and heating are accomplished by utilizing interstage heat regenerators intermediate the plurality of adsorbent material beds thereby increasing the thermal efficiency and effecting the proper temperature relationship among the adsorbent beds.

4. The method defined in claim 2, wherein the steps of cooling and heating are accomplished by alternately cooling and heating the container of the adsorbent material, thereby cooling and heating the adsorbent material.

5. The method defined in claim 1, wherein the steps of cooling and heating are accomplished by alternately cooling and heating the stream of fluid mixture prior to the entry thereof over the adsorbent material, thereby cooling and heating the adsorbent material.

6. The method defined in claim 1, wherein the steps of cooling and heating is accomplished by containing the adsorbent material in suitable means, alternately cooling and heating the containing means, thereby cooling and heating the adsorbent material contained therein.

References Cited

UNITED STATES PATENTS

| | | | |
|---|---|---|---|
| 1,758,398 | 5/1930 | Hasche | 55—27 |
| 2,675,089 | 4/1954 | Kahle | 55—62 |
| 3,377,812 | 4/1968 | Garrett et al. | 55—62 X |
| 3,445,990 | 5/1969 | Hays et al. | 55—62 X |

SAMIH ZAHARNA, Primary Examiner

U.S. Cl. X.R.

23—312; 55—62; 62—18; 210—32